US008468279B2

(12) United States Patent
Khosravi et al.

(10) Patent No.: US 8,468,279 B2
(45) Date of Patent: Jun. 18, 2013

(54) PLATFORM BASED VERIFICATION OF CONTENTS OF INPUT-OUTPUT DEVICES

(75) Inventors: Hormuzd M. Khosravi, Portland, OR (US); Venkat R. Gokulrangan, Portland, OR (US); Yasser Rasheed, Beaverton, OR (US); Men Long, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 12/415,612

(22) Filed: Mar. 31, 2009

(65) Prior Publication Data

US 2010/0250797 A1 Sep. 30, 2010

(51) Int. Cl.
*G06F 3/00* (2006.01)
*G06F 5/00* (2006.01)

(52) U.S. Cl.
USPC .......................................................... 710/48

(58) Field of Classification Search
USPC .......................................................... 710/48
See application file for complete search history.

(56) References Cited

U.S. PATENT DOCUMENTS

| 5,150,465 | A | * | 9/1992 | Bush et al. | 710/14 |
| 7,310,817 | B2 | * | 12/2007 | Hinchliffe et al. | 726/24 |
| 7,743,417 | B2 | * | 6/2010 | Williams | 726/24 |
| 2006/0195904 | A1 | | 8/2006 | Williams | |
| 2006/0218267 | A1 | * | 9/2006 | Khan et al. | 709/224 |
| 2007/0261118 | A1 | * | 11/2007 | Lu | 726/24 |
| 2009/0138969 | A1 | * | 5/2009 | Kim et al. | 726/22 |

FOREIGN PATENT DOCUMENTS

| CN | 101063959 | 10/2007 |
| EP | 1280040 | 1/2003 |
| JP | 08-179942 | 7/1996 |

OTHER PUBLICATIONS

Extended European Search Report for European Patent Application No. 10158126.2, Mailed Jun. 29, 2010, 7 pages.
"Enhanced Host Controller Interface Specification for Universal Serial Bus, Rev. 1.0", Retrieved from the Internet: URL: www.intel.com/technology/usb/download/ehci-r10.pdf, (Mar. 12, 2002), 155 pages.
Office Action for Korean Patent Application No. 10-2010-28392, Mailed Jun. 10, 2011, 6 pages.
"42P29924JP; Notification of Reason for Refusal Japanese Patent Application No. P2010-074573.", (Dec. 20, 2011), 3 pgs.
First Office Action for Chinese Patent Application No, 201010156221.X, issued Apr. 24, 201212. Mailed date of the Foreign Associate Jun. 18, 2012., 12 pages.

* cited by examiner

*Primary Examiner* — Chun-Kuan Lee
(74) *Attorney, Agent, or Firm* — Blakely, Sokoloff, Taylor & Zafman LLP

(57) ABSTRACT

A platform to support verification of the contents of an input-output device. The platform includes a platform hardware, which may verify the contents of the I/O device. The platform hardware may comprise components such as manageability engine and verification engine that are used to verify the contents of the I/O device even before the contents of the I/O device are exposed to an operating system supported by a host. The platform components may delete the infected portions of the contents of I/O device if the verification process indicates that the contents of the I/O device include the infected portions.

27 Claims, 4 Drawing Sheets

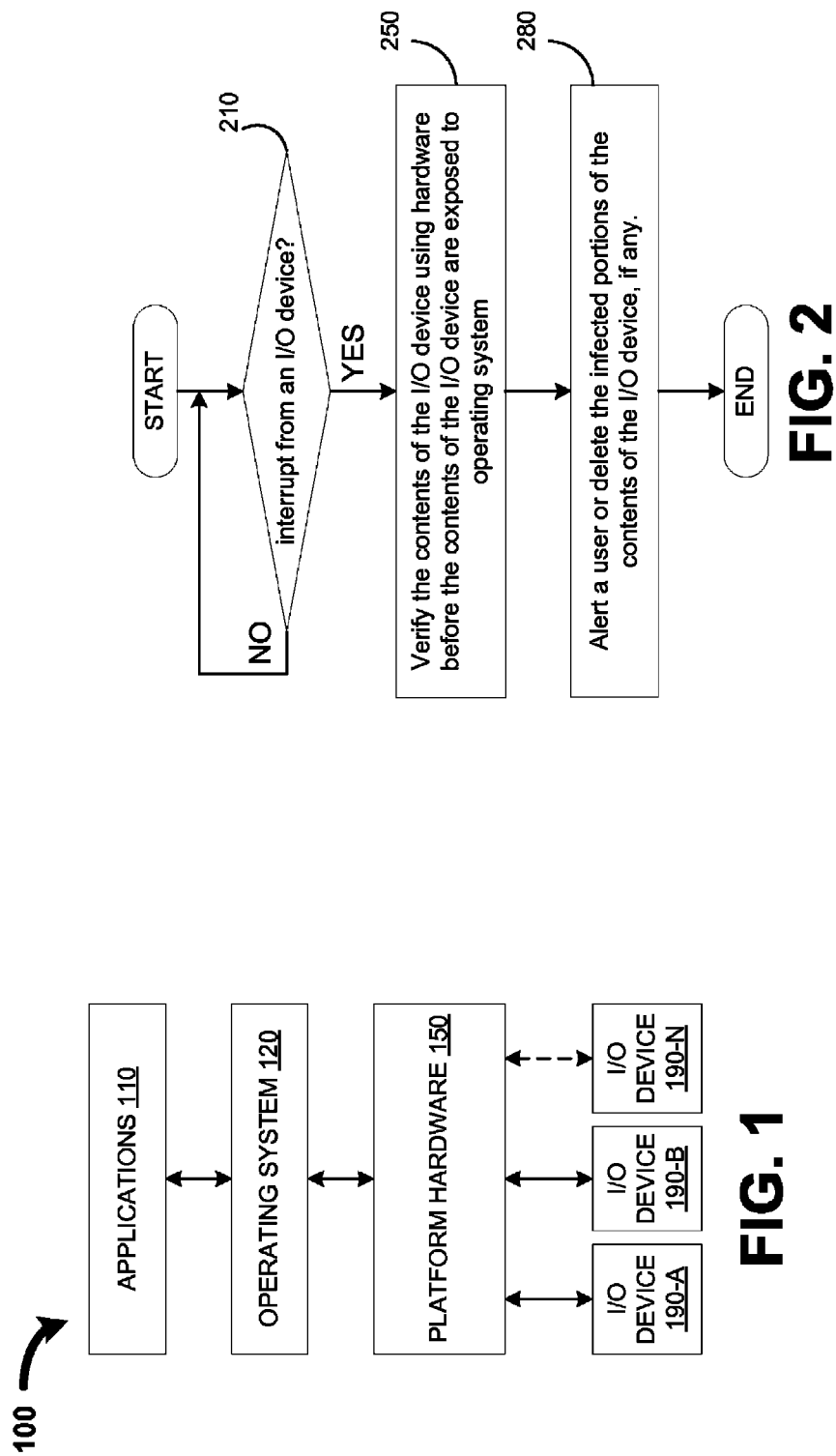

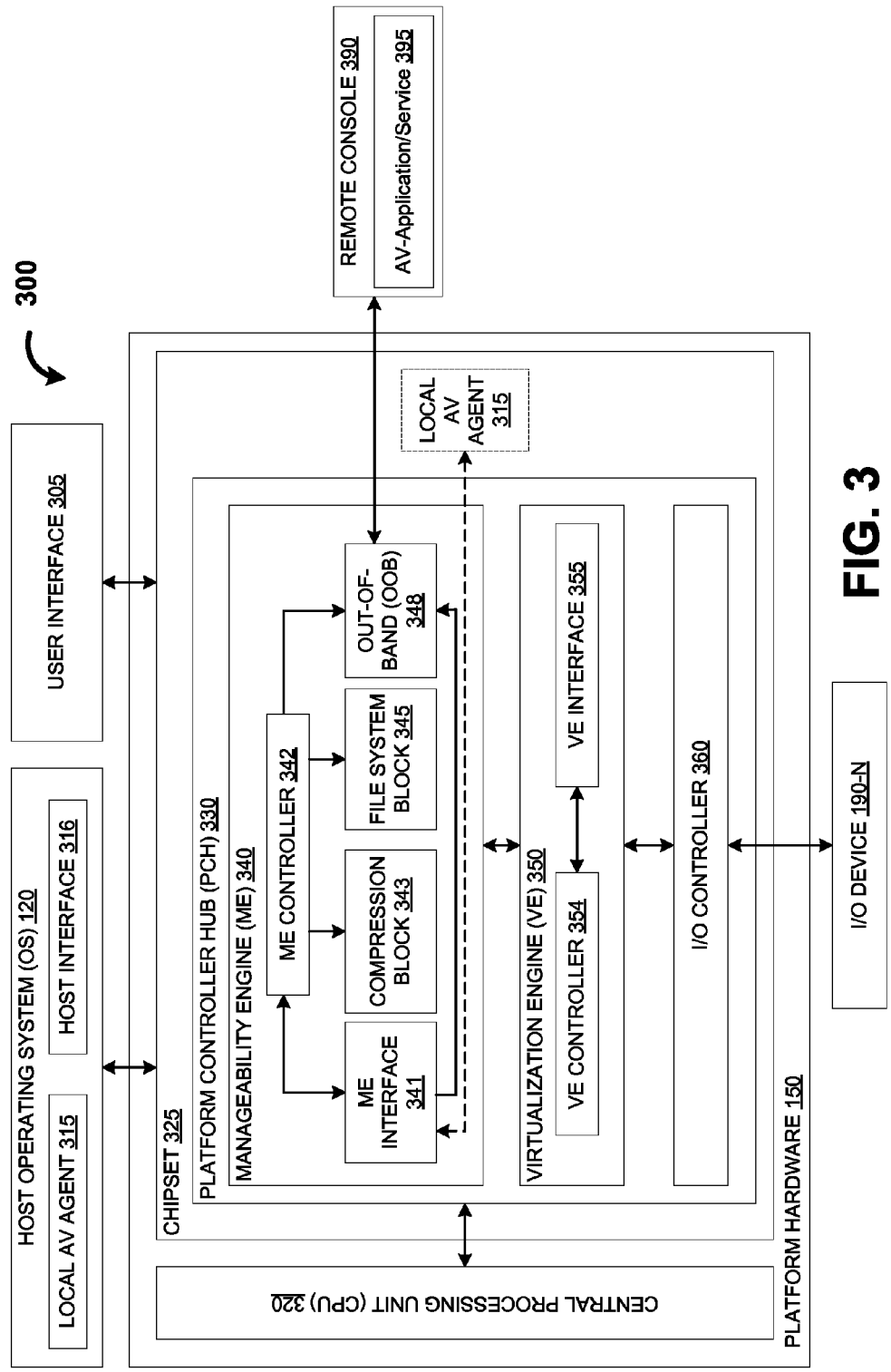

PLATFORM BASED VERIFICATION OF CONTENTS OF INPUT-OUTPUT DEVICES

BACKGROUND

Input-output devices such as universal serial bus (USB) flash drives, compact disk read-only memory (CD-ROM), pen drives are, unfortunately, being used as a common medium to spread malware/worms/viruses over enterprise networks and internet based networks. For example, common viruses such as "Ravmon", "Orkut is banned", "New Folder-.exe" are spreading through USB drives. Most of the Anti-virus programs available in the market place are unable to detect them and even if the viruses are detected, the anti-virus programs are unable to delete the infected files. The anti-virus programs may only quarantine the infected files.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 1 illustrates a platform 100, which supports a technique to verify the contents of the I/O device in hardware before the contents are exposed to the operating system (OS) according to one embodiment.

FIG. 2 is a flow-chart illustrating a technique to verify the contents of the I/O device in hardware before the contents are exposed to the OS according to one embodiment.

FIG. 3 illustrates an platform based architecture, which may support a technique to verify the contents of the I/O device in the hardware before the contents are exposed to the OS according to one embodiment.

DETAILED DESCRIPTION

Figure 4:
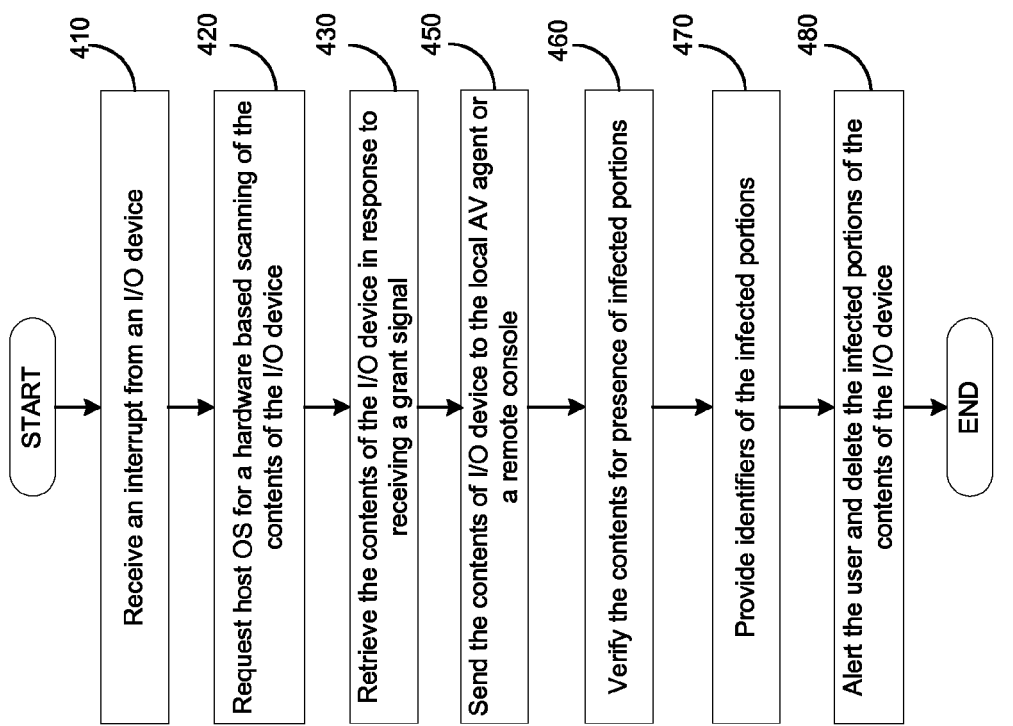
FIG. 4 is a flow-chart illustrating a technique in which components of FIG. 3 together verify the contents of the I/O device before the contents are exposed to the OS according to one embodiment.

The following description describes embodiments of a platform based verification of the contents of the I/O devices. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

In one embodiment, the platform 100 may comprise applications 110, a host operating system (OS) 120, a platform hardware 150, and I/O devices 190. In one embodiment, the applications 110 may comprise one or more applications supported by the host OS 120 and the platform hardware 150.

In one embodiment, the platform hardware 150 may comprise one or more processing cores, chipset, memory, and such other similar hardware components. In one embodiment, the platform hardware 150 may support components such as a firmware, manageability engine (ME) and virtualizer engine (VE). In one embodiment, the platform hardware 150 may verify the contents of the I/O device 190-N even before the contents are exposed to the host OS 120 in response to receiving an interrupt from an I/O device 190-N. In one embodiment, the OS independent hardware based verification process may avoid the platform 100 from being infected by the malware or virus. In one embodiment, the verification of the contents of the I/O devices may be applicable to legacy I/O devices and the verification process may also provide better user experience.

An embodiment of the operation of the platform 100, which may verify the contents of the I/O device before the contents are exposed to the host OS 120 is illustrated in flow-chart of FIG. 2.

In block 210, the platform hardware 150 may receive an interrupt from an I/O device such as the I/O device 190-N and control passes to block 250 in response to receiving the interrupt. In one embodiment, the interrupt may be generated in response to an input-output device 190-N such as a USB drive or a pen drive plugged into the platform 100.

In block 250, the platform hardware 150 may verify the contents of the I/O device 190-N even before the contents of the I/O device 190-N are exposed to the host OS 120. In one embodiment, the platform hardware 150 may detect infected portions of the contents of the I/O device 190-N if the contents comprise infected portions.

In block 280, the platform hardware 150 may alert a user or delete the infected portions of the contents of the I/O device 190-N, if any, even before the infected portions affect the platform 100.

An embodiment of a platform architecture 300 comprising hardware or firmware components that enable verification of the contents of an I/O device before the contents are exposed to the host OS is illustrated in FIG. 3. In one embodiment, the host OS 120 may support a local AV agent 315 and a host interface 316. In one embodiment, the platform hardware 150 may include a central processing unit 320 and chipset 325, which may support a platform control hub (PCH) 330. In other embodiment, the chipset 325 may support a local AV interface 315 in which case the host OS 120 may not comprise the local AV interface 315.

In one embodiment, the CPU 320 may support the host OS 120. In one embodiment, the platform controller hub PCH 330 may comprise a manageability engine ME 340, a virtualizer engine VE 350, and an I/O controller 360.

In one embodiment, the I/O controller 360 may receive an interrupt signal after the I/O device 190-N is coupled to the platform 300. In one embodiment, the I/O controller 360 may provide interrupt information to the virtualizer engine VE 350. In one embodiment, the I/O controller 360 may receive an interrupt from a USB based I/O device and may provide the interrupt information based on, for example, extended host command interface (EHCI) standards.

In one embodiment, the virtualizer engine VE 350 may comprise a virtualizer engine (VE) controller 354 and a virtualizer engine (VE) interface 355. In one embodiment, the VE interface 355 may support exchange of information between the VE 350 and the I/O controller 360. In one embodiment, the VE interface 355 may receive an interrupt signal from the I/O controller 360 and may pass information of the interrupt signal to the VE controller 354. In one embodiment, the VE interface 355 may receive scanning request from the VE controller 354 in response to sending the interrupt signal and may forward the scanning request to the ME 340. In one embodiment, the VE interface 355 may use interfaces such as manageability engine command interface (MECI) to support MECI connection to the ME 340 and an extended host command interface (EHCI) to support EHCI connection to the I/O controller 360.

In one embodiment, the VE controller 354 may support drivers that allow the VE controller 354 to generate the scanning request for initiating a hardware based scanning of the contents of the I/O device 190-N. In one embodiment, the VE controller 354 may generate a hardware based scanning request based on the interruption signal received from the VE interface 355. In one embodiment, the scanning request may allow a user of the platform to provide inputs on whether the scanning of the contents of the I/O device 190-N is to be performed. In one embodiment, the VE controller 354 may send the scanning request to the VE interface 355.

In one embodiment, the manageability engine ME 340 may comprise ME interface 341, ME controller 342, compression block 343, file system block 345, and out-of-band (OOB) 348. In one embodiment, the ME interface 341 may support exchange of information with the VE 350 and the local AV agent 315, which may be provisioned either in a host OS 120 or within the platform hardware 130. In one embodiment, the ME interface 341 may receive scanning request and forward the scanning request to the ME controller 342. In one embodiment, the ME interface 341 may receive contents of the I/O device 190-N after the ME controller 342 issues a command to retrieve the contents and may pass the contents to the ME controller 342. In one embodiment, the ME interface 341 may support interfaces such as manageability engine command interface (MECI) to support a MECI connection to the VE 350 and host embedded control interface (HECI) to support a HECI connection to the host OS 120. In one embodiment, the ME interface 341 may also support proprietary protocols to support communication between the local AV agent 315 and the ME 340 if the local AV agent 315 is provisioned within the platform hardware 130.

In one embodiment, the ME controller 342 may forward the scanning request to a user via user interface UI 305. In one embodiment, the ME controller 342 may use UI 305 to receive user inputs such as a grant signal for verification of the contents of the I/O device 190-N from a user in response to the scanning request. In one embodiment, the ME controller 342 may retrieve contents of the I/O device 190-N for verification based on the user input. In one embodiment, the ME controller 342 may use EHCI driver supported by the VE controller 354 to retrieve the contents of the USB type I/O device 190-N. In one embodiment, the ME controller 342 may store the contents of the I/O device 190-N in a file system block 345. In one embodiment, the file system block 345 may support file allocation table (FAT-32) format and the contents of the I/O device 190-N may be stored on a per-file basis. In one embodiment, the ME controller 342 may generate hash of each file of the I/O device 190-N.

In one embodiment, ME controller 342 may send the contents of the I/O device 190-N to the local AV agent 315 or to a remote console 390 for verification. In one embodiment, the ME controller 342 may send the hash values to the local AV agent 315 if the ME controller 342 uses the local AV agent 315 for verification of the contents of the I/O device 190-N. While using remote verification process, in one embodiment, the ME controller 342 may compress the contents of the I/O device 190-N using the compression block 343 to conserve network bandwidth. In one embodiment, the compression block 343 may use compression algorithms such as Lempel-ziv LZ1, LZ2 algorithms or any other lossy or lossless algorithms, for example. In one embodiment, the ME controller 342 may send the compressed contents to the out-of-band communication block OOB 348 via the ME interface 341. In one embodiment, the OOB 348 may use out-of-band signaling mechanism to send the compressed contents to the AV application/service 395 supported by the remote console 390.

In one embodiment, the ME controller 342 may receive the results of verification and may alert the user if the verification results indicate presence of infected portions in the contents of the I/O device 190-N. In one embodiment, the ME controller 342 may receive a log of the infected portions of the contents from one of the local AV agent 315 or AV application/service 395. In one embodiment, the ME controller 342 may initiate deletion process in which the infected portions of the contents of the I/O device 190-N may be deleted. In one embodiment, the ME controller 342 may provide the information of the infected portions the user or host OS 120.

In one embodiment, the host OS 120 may support a local anti-virus (AV) agent 315 and a host interface 316. In one embodiment, the host interface 316 may support, for example, HECI interface to provide a HECI connection to the platform hardware 130. In one embodiment, the local AV agent 315 may receive contents of the I/O device 190-N from the platform controller hub PCH 330 over the HECI connection and may process the contents of the I/O device 190-N to detect presence of infected portions. In one embodiment, the local AV agent 315 may detect presence of viruses, malware, or worms (infected portions) in the contents and may provide such information of the infected portions to the ME 340 over HECI connection. In one embodiment, the local AV agent 135 may scan the contents and provide results to PCH 330 before the PCH 330 may expose the I/O device 190-N such as a USB device to host OS 120 for auto-play.

In other embodiment, the local AV agent 315 may be supported by a chipset provisioned within the platform hardware 130. In such a case, the local AV agent 315 may receive the contents of the I/O device 190-N over proprietary communication medium and detect the presence of infected portions. In one embodiment, the local AV agent 315 may detect presence of viruses, malware, or worms (infected portions) in the contents and may provide such information of the infected portions to the ME 340 over proprietary connection. In one embodiment, the local AV agent 135 supported by the PCH 330 may scan the contents and provide results to ME 340. In one embodiment, such an approach may avoid transfer of contents of the I/O device 190-N over the HECI connection.

In one embodiment, the remote console 390 may comprise AV application/services 395, which may uncompress the compressed contents before performing a anti-virus scan. In one embodiment, the AV application/services 395 may verify the contents and send a log of the infected portions to the ME 340 if the AV applications/services 395 detect presence of the infected portions.

A flow-chart illustrating the operation of the platform components of FIG. 3 to verify the contents of the I/O device 190-N before the contents are exposed to the host OS 120 is illustrated in flow-chart of FIG. 4.

In block 410, the I/O controller 360 may receive an interrupt from an I/O device such as the I/O device 190-N and may pass the interrupt signal to the VE 350.

In block 420, the VE controller 354 may send a request to the host OS 120 or a user using UI 305 for a hardware based scanning of the contents of the I/O device 190-N. In block 430, the ME controller 342 may retrieve the contents of the I/O device 190-N using a driver supported by the VE controller 354 if the user selects to scan the contents of the I/O device 190-N.

In block 450, the ME controller 342 may send the contents of the I/O device 190-N to the local AV agent 315 or the AV application/service 395 of the remote console 390.

In block 460, the local AV agent 315 or the AV application/service 395 may verify the contents of the I/O device 190-N for presence of infected portions. In one embodiment, the local AV agent 315 or the AV application/service 395 may generate information (or a log), which may comprise indications of the infected portions of the contents of I/O device 190-N.

In block 470, the local AV agent 315 or the AV application/service 395 may provide information (or a log) to the ME 340.

In block 480, the ME controller 342 may alert the user and then delete the infected portions even before the infected portions are exposed to the operating system. In one embodiment, the ME controller 342 may delete the infected portions after receiving the information, which may indicate the presence of infected portions in the contents of the I/O device 190-N.

Figure 5:
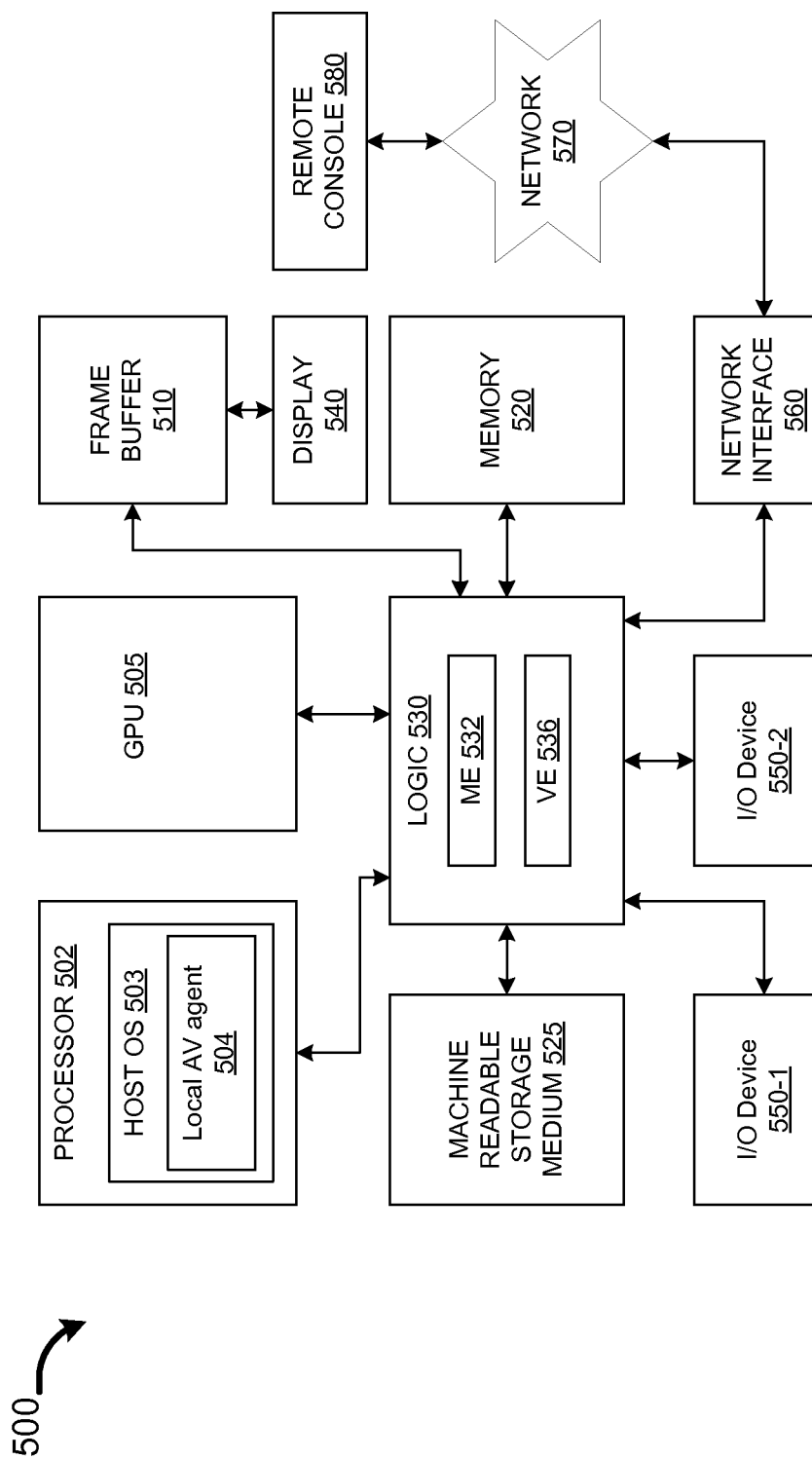
FIG. 5 illustrates a system 500, which supports verification of the contents of the I/O device before the contents are exposed to the OS according to one embodiment.

Referring to FIG. 5, a computer system 500 may include a general purpose processor 502 including a single instruction multiple data (SIMD) processor and a graphics processor unit (GPU) 505. The processor 502, in one embodiment, may perform enhancement operations in addition to performing various other tasks or store a sequence of instructions, to provide enhancement operations in a machine readable storage medium 525. However, the sequence of instructions may also be stored in the memory 520 or in any other suitable storage medium.

While a separate graphics processor unit 505 is depicted in FIG. 5, in some embodiments, the graphics processor unit 505 may be used to perform enhancement operations, as another example. The processor 502 that operates the computer system 500 may be one or more processor cores coupled to logic 530. The logic 530 may be coupled to one or more I/O devices 560, which may provide interface the computer system 500. The logic 530, for example, could be chipset logic in one embodiment. The logic 530 is coupled to the memory 520, which can be any kind of storage, including optical, magnetic, or semiconductor storage. The graphics processor unit 505 is coupled through a frame buffer 510 to a display 540.

The logic 530 may support manageability engine ME 532 and virtualizer engine VE 536. In one embodiment, the ME 532 may be similar to the ME 342 described with reference to FIG. 3 above and VE 536 may be similar to the VE 354 described with reference to FIG. 3 above. In one embodiment the logic 530 may receive an interrupt from an I/O device such as the I/O device 550-2 and initiate the VE 536. In one embodiment, the interrupt may be generated in response to an I/O device 550-2 such as a USB drive or a pen drive plugged into the computer system 500.

In one embodiment, the ME 532 and VE 536 may cause the contents of the I/O device 550-2 to be verified even before the contents of the I/O device 550-2 are exposed to the host OS 503 supported by the processor 502. In one embodiment, the local AV agent 504 or an agent supported by the remote console 580 may detect infected portion of the contents if the contents are infected. In one embodiment, the agent of the remote console 580 may be used by sending the contents to the agent using the network 570. In one embodiment, the computer system 500 may be coupled to the network 570 using the network interface 560. In one embodiment, the ME 532 may alert a user or delete the infected portions of the contents of the I/O device 550-2 after detecting any infected portion in the contents.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method to verify contents of an input-output (I/O) device in a computing system comprising:
   receiving, at a platform hardware of the computing system, an interrupt from the I/O device to perform a platform hardware-based scanning of the contents of the I/O device, wherein the platform hardware-based scanning is performed at the platform hardware of the computing system serving at a host computing system and wherein the platform hardware-based scanning is performed independent of and without interfering with an operating system of the computing system, wherein the platform hardware-based scanning includes
   verifying, at the platform hardware, the contents of the I/O device before the contents of the I/O device are exposed to the operating system;
   detecting, at the platform hardware, infected portions of the contents if the infected portions are present within the contents of the I/O device; and
   deleting, via the platform hardware, the infected portions of the contents before the contents are exposed to the operating system.

2. The method of claim 1, wherein the contents of the I/O device are provided to a local anti-virus agent after receiving a grant signal to a request to perform platform hardware-based scanning of the contents, wherein the operating system is to support the local anti-virus agent.

3. The method of claim 2, further comprising storing the contents of the I/O device based on a file allocation table (FAT-32) format.

4. The method of claim 3, further comprising compressing the contents of the USB based I/O device stored in the FAT-32 format.

5. The method of claim 1, wherein the contents of the I/O device are provided to a local anti-virus agent after receiving a grant signal, wherein the hardware components is to support the local anti-virus agent.

6. The method of claim 1, further comprising receiving information from a local anti-virus agent, wherein the information indicates infected portions of the contents of the I/O device.

7. The method of claim 1, wherein the contents of the I/O device are provided to an agent supported by a remote console, wherein an out-of-band communication technique is used to provide the contents to the agent supported by the remote console.

8. The method of claim 1, wherein the platform hardware is based on a chipset of the computing system, wherein the platform hardware includes a manageability engine and a virtualization engine to facilitate the platform hardware-based scanning.

9. The method of claim 1, wherein the operating system serves as a host operating system having a local AV agent in communication with the manageability engine and virtualization engines to facilitate the platform hardware-based scanning, wherein the local AV agent to verify the contents of the I/O device.

10. An apparatus to verify contents of an input-output (I/O) device in a computing system comprising:
    a platform hardware of the computing system coupled to the I/O device, wherein the platform hardware is to receive an interrupt from the I/O device to perform a platform hardware-based scanning of the contents of the I/O device, wherein the platform hardware-based scanning is performed at the platform hardware of the computing system serving at a host computing system and wherein the platform hardware-based scanning is performed independent of and without interfering with an operating system of the computing system, wherein the platform hardware-based scanning includes
    verifying the contents of the I/O device, independent of an operating system, before the contents of the I/O device are exposed to an operating system;
    detecting infected portions of the contents, if the infected portions are present within the contents of the I/O device; and
    deleting the infected portions of the contents before the contents are exposed to the operating system.

11. The apparatus of claim 10, the platform hardware comprises a manageability engine coupled to the virtualizer engine, wherein the manageability engine includes a manageability engine controller, wherein the manageability engine controller is to provide the contents of the I/O device to a local anti-virus agent supported by the operating system in response to receiving a grant signal to a request to perform platform hardware-based scanning of the contents.

12. The apparatus of claim 11, wherein the manageability engine controller is further to store the contents of the I/O device based on a file allocation table (FAT-32) format.

13. The apparatus of claim 10, wherein the manageability engine controller is further to receive information from the local anti-virus agent, wherein the information is to indicate infected portions of the contents of the I/O device.

14. The apparatus of claim 12, wherein the manageability engine controller is further to initiate compression of the contents of the USB based I/O device stored in the FAT-32 format.

15. The apparatus of claim 10, wherein the manageability engine controller is further to provide the contents of the I/O device to an agent supported by a remote console, wherein the manageability engine controller is further to use an out-of-band communication technique to provide the contents to the agent supported by the remote console.

16. The apparatus of claim 10, wherein the manageability engine controller is further to provide the contents of the I/O device to a local anti-virus agent supported by the platform hardware in response to receiving a grant signal to perform platform hardware-based scanning of the contents.

17. The apparatus of claim 10, wherein the platform hardware is based on a chipset of the computing system, wherein the platform hardware includes a manageability engine and a virtualization engine to facilitate the platform hardware-based scanning.

18. The apparatus of claim 10, wherein the operating system serves as a host operating system having a local AV agent in communication with the manageability engine and virtualization engines to facilitate the platform hardware-based scanning, wherein the local AV agent to verify the contents of the I/O device.

19. A system to verify contents of an input-output (I/O) device comprising:
    a computing device having a memory to store instructions, and a processing device to execute the instructions, wherein the computing device includes a platform hardware coupled to the I/O device, and wherein the instructions cause the processing device to
    facilitate the platform hardware is to receive an interrupt from the I/O device to perform a platform hardware-based scanning of the contents of the I/O device, wherein the platform hardware-based scanning is performed at the platform hardware of the computing system serving at a host computing system and wherein the platform hardware-based scanning is performed independent of and without interfering with an operating system of the computing system, wherein the platform hardware-based scanning includes
    verifying the contents of the I/O device, independent of an operating system, before the contents of the I/O device are exposed to an operating system;
    detecting infected portions of the contents, if the infected portions are present within the contents of the I/O device; and
    deleting the infected portions of the contents before the contents are exposed to the operating system.

20. The system of claim 19, the platform hardware comprises a manageability engine coupled to the virtualizer engine, wherein the manageability engine includes a manageability engine controller, wherein the manageability engine controller is to provide the contents of the I/O device to a local anti-virus agent supported by the operating system in response to receiving a grant signal to a request to perform platform hardware-based scanning of the contents.

21. The system of claim 19, wherein the manageability engine controller is further to provide the contents of the I/O device to a local anti-virus agent supported by the platform hardware in response to receiving a grant signal to perform platform hardware-based scanning of the contents.

22. The system of claim 21, wherein the manageability engine controller is further to store the contents of the I/O device based on a file allocation table (FAT-32) format.

23. The system of claim 19, wherein the manageability engine controller is further to receive information from the local anti-virus agent, wherein the information is to indicate infected portions of the contents of the I/O device.

24. The system of claim 23, wherein the manageability engine controller is further to initiate compression of the contents of the USB based I/O device stored in the FAT-32 format.

25. The system of claim 19, wherein the manageability engine controller is further to provide the contents of the I/O device to an agent supported by a remote console, wherein the manageability engine controller is further to use an out-of-band communication technique to provide the contents to the agent supported by the remote console.

26. The system of claim 19, wherein the platform hardware is based on a chipset of the computing system, wherein the platform hardware includes a manageability engine and a virtualization engine to facilitate the platform hardware-based scanning.

27. The system of claim 19, wherein the operating system serves as a host operating system having a local AV agent in communication with the manageability engine and virtualization engines to facilitate the platform hardware-based scanning, wherein the local AV agent to verify the contents of the I/O device.

* * * * *